US012162499B2

(12) United States Patent
Gigerl et al.

(10) Patent No.: US 12,162,499 B2
(45) Date of Patent: Dec. 10, 2024

(54) METHOD AND DEVICE FOR PREDICTIVE VEHICLE CONTROL (71) Applicant: AVL List GmbH, Graz (AT)

(72) Inventors: Hans Peter Gigerl, Gutenberg-Stenzengreith (AT); David Lemmerer, Weiz (AT); Johannes Jany-Luig, Graz (AT)

(73) Assignee: AVL List GmbH, Graz (AT)

( * ) Notice: Subject to any disclaimer, the term of this patent is extended or adjusted under 35 U.S.C. 154(b) by 340 days.

(21) Appl. No.: 17/618,560

(22) PCT Filed: Jun. 10, 2020

(86) PCT No.: PCT/AT2020/060241
§ 371 (c)(1),
(2) Date: Dec. 13, 2021

(87) PCT Pub. No.: WO2020/247999
PCT Pub. Date: Dec. 17, 2020

(65) Prior Publication Data
US 2022/0258745 A1 Aug. 18, 2022

(30) Foreign Application Priority Data
Jun. 13, 2019 (AT) .............................. A 50532/2019

(51) Int. Cl.
*B60W 50/00* (2006.01)
*B60W 10/06* (2006.01)
(Continued)

(52) U.S. Cl.
CPC ........ *B60W 50/0097* (2013.01); *B60W 10/06* (2013.01); *B60W 10/18* (2013.01); *B60W 50/0205* (2013.01)

(58) Field of Classification Search
CPC .. B60W 50/0097; B60W 10/06; B60W 10/18; B60W 50/0205
See application file for complete search history.

(56) References Cited

U.S. PATENT DOCUMENTS 7,124,027 B1 * 10/2006 Ernst, Jr. ............... B60W 30/09
701/301
8,818,042 B2 * 8/2014 Schofield ............. G06V 20/584
348/211.3
(Continued)

FOREIGN PATENT DOCUMENTS

CN 104010863 8/2014
DE 102006029904 1/2008
(Continued)

OTHER PUBLICATIONS

International Search Report and the Written Opinion Dated Oct. 7, 2020 From the International Searching Authority Re. Application No. PCT/AT2020/060241 and Its Translation of Search Report Into English. (12 Pages).
(Continued)

*Primary Examiner* — Luis A Martinez Borrero (57) ABSTRACT

The present invention relates to a device having at least one computing unit, which is configured to ascertain a specified target power profile curve (213) for a vehicle, to determine a tolerance band (211) for the target power profile curve (213), wherein the tolerance band (211) is limited by an upper limit line (215) and a lower limit line (217), to determine an expectation characteristic curve (219) for a power of the vehicle to be expected in the future by extrapolating a power development of the vehicle at a current setting of the vehicle for a specified temporal prediction window (229), and to enable a control command (315, 319) to be provided by the driver model in order to modify the setting of the vehicle in the event that the
(Continued)

expectation characteristic curve (219) intersects at least one of the upper limit line (215) and the lower limit line (217) of the tolerance band (211) within the temporal prediction window (229).

12 Claims, 4 Drawing Sheets

(51) Int. Cl.
*B60W 10/18* (2012.01)
*B60W 50/02* (2012.01)

(56) References Cited

U.S. PATENT DOCUMENTS

| | | | | |
|---|---|---|---|---|
| 9,008,369 | B2* | 4/2015 | Schofield | G06V 20/582 |
| | | | | 382/104 |
| 9,171,217 | B2* | 10/2015 | Pawlicki | B60W 10/04 |
| 9,191,634 | B2* | 11/2015 | Schofield | B60Q 9/008 |
| 9,248,836 | B2* | 2/2016 | Johansson | B60K 31/00 |
| 9,428,192 | B2* | 8/2016 | Schofield | B60R 11/04 |
| 10,102,590 | B1* | 10/2018 | Farnsworth | G06Q 40/08 |
| 10,802,477 | B1* | 10/2020 | Konrardy | G08G 1/166 |
| 11,010,286 | B1* | 5/2021 | Goksu | G06F 11/3688 |
| 11,656,978 | B1* | 5/2023 | Konrardy | B60W 40/04 |
| | | | | 703/22 |
| 2011/0313647 | A1 | 12/2011 | Koebler et al. | |
| 2013/0054050 | A1* | 2/2013 | Filev | B60W 50/0097 |
| | | | | 701/2 |
| 2014/0343818 | A1* | 11/2014 | Johansson | G05B 13/048 |
| | | | | 701/94 |
| 2014/0350821 | A1* | 11/2014 | Johansson | B60W 30/143 |
| | | | | 701/93 |
| 2015/0224845 | A1* | 8/2015 | Anderson | F03G 7/08 |
| | | | | 701/37 |
| 2016/0082947 | A1* | 3/2016 | Naumann | G01C 21/3469 |
| | | | | 701/22 |
| 2017/0182859 | A1* | 6/2017 | Anderson | B60G 17/019 |
| 2018/0134106 | A9* | 5/2018 | Anderson | B60G 13/14 |
| 2018/0154898 | A1 | 6/2018 | Wrobel | |
| 2018/0154899 | A1* | 6/2018 | Tiwari | B60W 50/082 |
| 2019/0001782 | A1* | 1/2019 | Anderson | B60G 13/14 |
| 2020/0377082 | A1* | 12/2020 | Nassouri | B60W 30/0956 |
| 2021/0163021 | A1* | 6/2021 | Frazzoli | H04W 4/48 |
| 2021/0294877 | A1* | 9/2021 | Konrardy | G05D 1/0011 |
| 2021/0339595 | A1* | 11/2021 | Anderson | B60G 17/052 |
| 2022/0355803 | A1* | 11/2022 | Lemmerer | B60W 30/18109 |
| 2022/0355812 | A1* | 11/2022 | Jany-Luig | B60W 30/188 |
| 2023/0205684 | A1* | 6/2023 | Konrardy | G08G 1/161 |
| | | | | 703/22 |
| 2024/0101128 | A1* | 3/2024 | Bradley | B60W 50/0098 |

FOREIGN PATENT DOCUMENTS

| | | |
|---|---|---|
| DE | 102014012319 | 2/2016 |
| EP | 2420423 | 2/2012 |
| WO | WO 2013/095237 | 6/2013 |
| WO | WO 2013/095242 | 6/2013 |
| WO | WO 2017/130507 | 8/2017 |
| WO | WO 2020/247999 | 12/2020 |

OTHER PUBLICATIONS

Notification of Office Action and Seach Report Dated Jun. 29, 2023 From The State Intellectual Property Office of the People's Republic of China Re. Application No. 202080043213.6. (9 Pages).

* cited by examiner

METHOD AND DEVICE FOR PREDICTIVE VEHICLE CONTROL

RELATED APPLICATIONS

This application is a National Phase of PCT Patent Application No. PCT/AT2020/060241 having International filing date of Jun. 10, 2020, which claims the benefit of priority of Austria Patent Application No. A 50532/2019 filed on Jun. 13, 2019. The contents of the above applications are all incorporated by reference as if fully set forth herein in their entirety.

FIELD AND BACKGROUND OF THE INVENTION

The present invention relates to a method for operating a driver model for controlling a vehicle, a control device for operating a driver model for controlling a vehicle, the use of the control device to carry out a test run for a vehicle and a computer program product.

In particular, in order to carry out vehicle test runs, vehicles are operated according to a specified vehicle speed requirement. The vehicle speed requirement thereby serves as an independent variable on the basis of which a behaviour of the vehicle, for example a pollutant emission, is evaluated.

Described in the prior art are driver models, i.e. mathematical models for simulating a behaviour of a driver when driving a vehicle, which calculate a difference between a current vehicle speed requirement and a current vehicle speed. These driver models attempt, for example using a PI controller, to minimise a calculated difference between a current vehicle speed requirement and a current vehicle speed. Such driver models lead to an operation of a respective vehicle oriented solely on the current vehicle speed requirement which only to a limited extent simulates a behaviour of a human driver when driving a vehicle.

In particular, a control of a vehicle by means of a driver model which is oriented solely on a current vehicle speed requirement leads to frequent acceleration and deceleration processes which in turn lead to a higher fuel consumption in comparison with operation by a human driver and, in consequence, to increased pollutant emissions.

SUMMARY OF THE INVENTION

It is the object of the present invention to address, at least in part, the problems described above. In particular, it is an object of the present invention to make possible an operation of a vehicle using a driver model which makes possible maximum fuel- or emissions efficiency.

The above object is achieved through the claims. In particular, the above object is achieved through the method, the control device and the computer program product according to the respective subject matter of the independent claims.

Further advantages of the invention arise from the dependent claims, the description and the drawings. Naturally, features and details which are described in connection with the method also apply in connection with the control device according to the invention and vice versa, so that with regard to the disclosure, mutual reference is or can always be made to the individual aspects of the invention.

According to a first aspect of the present invention, a method for operating a driver model for controlling a vehicle is presented. The method according to the invention comprises ascertaining a specified target power profile curve for the vehicle, determining a tolerance band for the target power profile curve, wherein the tolerance band is limited by an upper limit line and a lower limit line, the upper limit line is determined on the basis of a profile of the target power profile curve plus a specified upper tolerance value, and wherein the lower limit line is determined on the basis of the profile of the target power profile curve minus a specified lower tolerance value. The method according to the invention further comprises determining an expectation characteristic curve for a power of the vehicle to be expected in the future by extrapolating a power development of the vehicle at a current setting of the vehicle for a prediction window with a specified temporal length, and enabling a control command by the driver model to change a setting of the vehicle in the event that the expectation characteristic curve intersects at least one of the upper limit line and the lower limit line of the tolerance band within the temporal prediction window.

When using a driver model in terms of the present invention on a test bench and/or in a vehicle, the speed of the vehicle in particular is considered. Depending on the test cycle which is to be performed, a target speed is specified for this purpose which varies over time and thus can also be described as a target speed profile. In order to complete the test cycle, the speed of the vehicle is controlled by means of its accelerator pedal and its brake pedal. As in test operation, an operation of the accelerator pedal serves to increase the actual speed in a quantitative manner and an operation of the brake pedal results in a corresponding reduction in the actual speed in a quantitative manner. When carrying out such a speed control, the profile of the actual speed in the form of a speed line should follow the profile of the target speed as exactly as possible. In particular, deviation limits are specified, for example in the form of a lower limit line and an upper limit line, which represent a maximum deviation from the target speed which may not be exceeded. The profile of the target speed and the profile of the actual speed are therefore not congruent, but differ from one another. The difference between the two profiles varies in magnitude depending on the quality of the control function and/or of the driver model.

Within the context of the present disclosure, the term "controlling" is to be understood to mean a control or regulation process.

Within the context of the present disclosure, "enabling a control command" is to be understood to mean a process wherein a change in a setting of a vehicle through a generated control command, for example an operation of a brake pedal, is permitted and implemented accordingly. In particular, "enabling a control command" is to be understood to mean an output of a control command on an output unit, for example a display and/or a loudspeaker, for implementation by a driver.

Within the context of the present disclosure, a "target power profile curve" is to be understood to mean a specified sequence of driving performances to be provided by a vehicle, for example a vehicle speed, an engine output, a braking power, an acceleration and/or a deceleration. A target power profile curve is in particular provided in a diagram which plots the time on a first axis and a driving performance on a second axis.

Within the context of the present disclosure, a "tolerance band" is to be understood to mean a value range which varies proportionally to a respective target power profile curve, and which is limited upwards by an upper limit line and downwards by a lower limit line. In particular, the upper limit line and the lower limit line thereby trace defined temporal deviations or "offsets" and speed-dependent deviations or "offsets" from the target power profile curve. The tolerance value can for example be specified by a user of a respective vehicle. In particular, a first tolerance value can be specified for the upper limit line and a second limit value for the lower limit line. Naturally, it is also conceivable that the first tolerance value and the second tolerance value are identical in amount.

Within the context of the present disclosure, an "expectation characteristic curve" is to be understood to mean a power to be expected in the future or a "predictive behaviour" of a respective vehicle. An expectation characteristic curve is determined by extrapolating a power development of the vehicle at a current setting of the vehicle for a prediction window with a specified temporal length. This means that within a specified prediction window, i.e. a time window with a specified length of for example between 2 seconds and 20 seconds, preferably between 2 seconds and 10 seconds, more preferably between 2 seconds and 5 seconds, particularly preferably of 4 seconds, the power development of the vehicle is predicted or determined from at least one current power value and optionally historical power values of the vehicle determined in the past. Since the power development of the vehicle substantially corresponds to the profile of the target power profile curve, as a rule an origin of the expectation characteristic curve lies within the tolerance band, i.e. between the lower limit line and the upper limit line. In particular, the power development of the vehicle overlays the target power profile curve.

Within the context of the present disclosure, a "setting of a vehicle" is to be understood to mean a configuration of a vehicle, for example an operation of a vehicle with a specified pedal position.

The present method serves in particular to allow a test run for a vehicle to be carried out partially automatically, wherein the selected control commands are selectively enabled or specified by a driver model in order for the vehicle to be controlled by a driver.

In particular, the present method serves to allow a test run for a vehicle to be carried out partially automatically, wherein the selected control commands are selectively enabled by a driver model in order for the vehicle to be controlled by a vehicle control device.

The present method is based on a tolerance band by means of which a future vehicle behaviour and driving performances to be provided in future are included in a process for controlling the vehicle. Accordingly, the tolerance band according to the invention allows a "predictive" control of a vehicle, wherein an occurrence of contrary control commands, for example accelerating and braking, which need to be implemented within a short time interval, for example within a second, is reduced. Accordingly, the present method makes possible a particularly smooth and consequently efficient operation of a vehicle with respect to fuel consumption and pollutant emissions.

Since, particularly in the case of a test cycle, for example a test bench run or a test to measure emissions in practical operation, a target power profile curve, i.e. a profile of driving performances to be performed by a vehicle over a specified time window is specified, respective driving performances to be performed in the future are always known in relation to a current time within the time window.

In order to avoid frequent corrective procedures due to the generation of control commands in reaction to minor changes in a respective target power profile curve, according to the present method a control command to change a current driving performance of a respective vehicle is only enabled if an expectation characteristic curve of the vehicle intersects a tolerance band of the target power profile curve, for example at its upper limit line and/or its lower limit line. A "prediction horizon" on the basis of a prediction window with specified duration or specified temporal length is thereby used, within which an occurrence of an intersection point between the expectation characteristic curve and the tolerance band leads to an enabling of a control command. This means in particular that a current setting of the vehicle is maintained if the expectation characteristic curve and the tolerance band do not intersect within the prediction window.

Naturally, the duration or the length of the prediction window according to the invention can vary according to a specified mathematical relationship depending on a driving performance currently provided by, or to be provided by the vehicle.

The prediction window according to the invention can be updated dynamically, i.e. in particular continuously over time or "online". This means that the prediction window also moves along the time axis with a current time when following a respective target power profile curve. Accordingly, the prediction window always extends from a current time or a time in the past for a specified duration up to a corresponding time in the future.

It can also be the case that the prediction window has a variable duration or temporal length. The temporal length of the prediction window can for example be selected depending on a status of the vehicle, in particular depending on a current speed of the vehicle.

It can also be the case that changing settings of a respective vehicle in the event that the expectation characteristic curve intersects the upper limit line involves enabling a first control command which results in a reduction in a power output of the vehicle and changing settings of the vehicle in the event that the expectation characteristic curve intersects the lower limit line involves enabling a second control command which results in an increase in a power output of the vehicle.

By increasing a power output of a respective vehicle in the event that a current expectation characteristic curve intersects a respective lower limit line within a respective prediction window or reducing a power output of the vehicle in the event that the expectation characteristic curve intersects a respective upper limit line within the prediction window, the power output of the vehicle is always kept within the tolerance band according to the invention.

It can also be the case that a respective first control command activates a braking system of a respective vehicle and/or causes a reduction in a power output of the drive, and a respective second control command configures a drive system of the vehicle to provide a higher power output in relation to a current power output.

Enabling respective control commands, for example to activate a braking system of a vehicle and/or to reduce a power output of a drive system, for example by "easing off" an accelerator pedal, or to increase a power output of a drive system of the vehicle, enables a driver or a vehicle control device to change a setting of the vehicle so as to operate the vehicle particularly efficiently according to the present method. This means that, in particular, only those control commands are enabled which are necessary according to the present method. In particular, it can be the case that control commands which are not necessary according to the present method are blocked or not enabled.

In order to enable a control command, a pedal control device can be switched from a blocked or not enabled mode into an enabled mode.

It can also be the case that an accelerator pedal and a brake pedal of the vehicle must be in a zero position in order for a change to take place between a first control command which activates a braking system of a respective vehicle and a second control command which configures a drive system of the vehicle to provide a higher power output in relation to a current power output.

By specifying a zero position of respective pedals or input means of a vehicle between two control commands with contrary effects, for example accelerating and braking, an unnecessarily frequent change of settings of the vehicle can be avoided. For this purpose, respective second control commands to increase a power output can for example be blocked if a brake pedal has not been in a zero position since its last activation according to a first control command.

It can also be the case that, in the event that the expectation characteristic curve according to the invention intersects at least one of the upper limit line and the lower limit line, a weighting factor is determined which varies depending on a time interval between an intersection point of the expectation characteristic curve and the upper limit line or the lower limit line and a current time.

In the event that several intersection points occur within a respective prediction window, an intersection point which is to be prioritised can be identified by means of a weighting factor which varies depending on a time interval between an intersection point of the expectation characteristic curve and the upper limit line or the lower limit line and a current time. For this purpose, it can for example be the case that an intersection point occurring closest to a current time leads to a high prioritisation and an intersection point particularly distant from the current time leads to a low prioritisation, so that the high-priority intersection point is used first, or before the low-priority intersection point, to enable a control command according to the present method.

It can also be the case that a respective expectation characteristic curve is determined on the basis of historical power data of a vehicle within a specified time window, starting out from a current time, and the expectation characteristic curve is determined on the assumption that a power output and/or a value of an acceleration of the vehicle remains constant within the prediction window.

A behaviour of the vehicle can be reliably extrapolated using historical power data which are for example obtained in a determination window which extends over a range of a few seconds, preferably 5 seconds, more preferably 4 seconds, particularly preferably 0.2 seconds before a current time up to the current time. A power output of the vehicle or of a drive system of the vehicle, a positive or negative acceleration of the vehicle, a torque output of the vehicle or of the drive system of the vehicle and/or any other technically suitable parameters for determining a movement pattern of the vehicle can thereby be used in order to extrapolate the expectation characteristic curve.

It can also be the case that the prediction window is continuously updated, wherein, within the prediction window, in a first checking step it is continuously checked whether the expectation characteristic curve intersects the upper limit line and in a second checking step it is continuously checked whether the expectation characteristic curve intersects the lower limit line.

By means of a first checking step in which it is checked whether the expectation characteristic curve intersects the upper limit line and a second checking step in which it is checked whether the expectation characteristic curve intersects the lower limit line, procedures for enabling a first control command to decelerate a vehicle or for enabling a second control command to increase a power output can be carried out independently of one another. Corresponding actuators, for example an accelerator pedal or a brake pedal, can therefore be operated independently of one another, i.e. also simultaneously.

In particular, it can be the case that procedures for enabling a first control command to decelerate a vehicle are carried out preferentially, so that for example if a first control command to decelerate the vehicle and a second control command to increase a power output of a drive system of the vehicle are to be enabled, only the first control command is actually enabled.

It can also be the case that in a respective first checking step it is in addition checked whether future power requirements specified through a target power profile curve continuously approach a zero value within a prediction window, and in the event that the future power requirements specified through the target power profile curve continuously approach the zero value within the prediction window a control command is enabled which brings the vehicle to a halt according to a specified procedure.

In order to avoid an unnecessary power output, a specified procedure can be provided for which brings a vehicle to a halt. For example, a sequence of braking activity and/or recuperation can be provided for this purpose. In order to recognise a driving situation which is suitable for the initiation of such a procedure, a profile of the target power profile curve according to the invention can in particular be evaluated, so that in the event of a continuous reduction in the respective values of the target power profile curve as from a current time for a specified duration, in particular for the duration of the prediction window according to the invention, the procedure is activated.

According to a second aspect, the present invention relates to a control device with at least one computing unit. The computing unit comprises at least a first ascertaining module for ascertaining a specified target power profile curve for the vehicle, a first determining module for determining a tolerance band for the target power profile curve, wherein the tolerance band is limited by an upper limit line and a lower limit line, a second ascertaining module for ascertaining the upper limit line on the basis of a profile of the target power profile curve plus a specified upper tolerance value, a third ascertaining module for ascertaining the lower limit line on the basis of the profile of the target power profile curve minus a specified lower tolerance value, a second determining module for determining an expectation characteristic curve for a power of the vehicle to be expected in the future by extrapolating a power development of the vehicle at a current setting of the vehicle for a specified temporal prediction window, and an enabling module for enabling a control command to be provided by the driver model in order to modify the setting of the vehicle in the event that the expectation characteristic curve intersects at least one of the upper limit line and the lower limit line of the tolerance band within the temporal prediction window.

Thus, a control device according to the invention brings the same advantages as have been described in detail with regard to the method according to the invention.

According to a third aspect, the present invention relates to the use of the present control device to carry out a test run for a vehicle.

According to a fourth aspect, the present invention relates to a computer program product with program code means for carrying out all steps of the present method when the program is run on a computer.

The computer program product can be implemented as computer-readable instruction code in any appropriate programming language such as JAVA or C++. The computer program product may be stored on a computer-readable storage medium such as a data disk, a removable drive, a volatile or non-volatile storage means, or in a built-in storage means/processor. The instruction code can program a computer or other programmable device such as regulating or control devices in such a way that the desired functions are carried out. Furthermore, the computer program product may be provided in a network such as the Internet, from which it can be downloaded by a user as required. The computer program product can be realised both by means of a computer program, i.e. as software, as well as by means of one or more special electronic circuits, i.e. as hardware, or in any hybrid form, i.e. by means of software components and hardware components.

BRIEF DESCRIPTION OF THE SEVERAL VIEWS OF THE DRAWINGS

Further measures to improve the invention are explained in the following description of various exemplary embodiments of the invention, which are represented schematically in the figures. All features and/or advantages resulting from the claims, the description or the figures, including constructive details and spatial arrangements, may be essential to the invention both in themselves and in the various combinations.

In Each Case Schematically.

DESCRIPTION OF SPECIFIC EMBODIMENTS OF THE INVENTION

Figure 1:
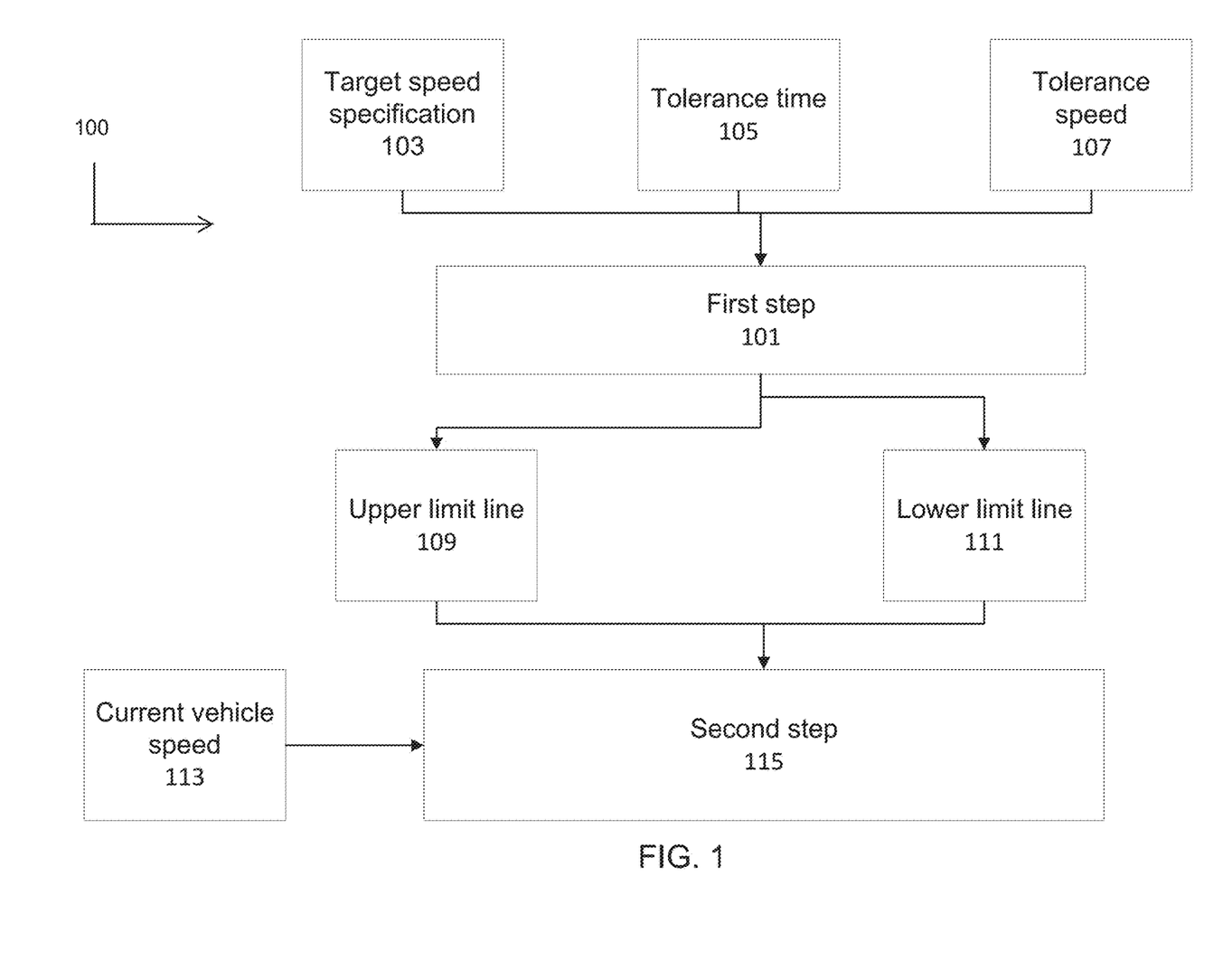
FIG. 1 shows a sequence of a possible embodiment of the method according to the invention.

FIG. 1 shows, in schematic form, a sequence 100 of a possible embodiment of the method according to the invention for setting a vehicle speed 113 as a power of a vehicle which is to be set.

In a first step 101, an upper limit line 109 and a lower limit line 111 of a tolerance band for a profile of the target speed specification 103 are determined on the basis of the input variables current target speed specification 103, tolerance time 105 and tolerance value or tolerance speed 107.

In particular, it can be the case that a tolerance band is determined for each time "t" of the target speed specification 103, wherein the following applies:

$$V_{tol,lower(t)} = \min(v(t) - \Delta v, \min(v(t - \Delta t, \ldots t, \ldots, t + \Delta t)) - \Delta v) \quad (1)$$

$$V_{tol,upper(t)} = \max(v(t) + \Delta v, \max(v(t - \Delta t, \ldots t, \ldots, t + \Delta t)) + \Delta v) \quad (2)$$

"$\Delta t$" and "$\Delta v$" are thereby specified parameters. The parameter "v" corresponds to a driving performance, for example a current speed 113 of a vehicle, "t" corresponds to the time, in particular in [seconds], "$V_{tol,lower(t)}$" corresponds to a value of the lower limit line 111 at the point "t", "$V_{tol,upper(t)}$" corresponds to a value of the upper limit line 109 at the point "t".

In particular, a tolerance band can be determined on the basis of 5-dimensional vectors which in each case comprise values for "$V_{tol,lower(t)}$" and "$V_{tol,upper(t)}$" at the points "t", "t+1", "t+2", "t+3" and "t+4", wherein their input variables comprise target power profile values at the points "t", "t+1", "t+2", "t+3" "t+4" and "t+6" as well as the parameters "$\Delta t$" and "$\Delta v$". "$\Delta t$" can thereby be limited to a maximum value of "2". In particular, respective values for "$V_{tol,lower(t)}$" and "$V_{tol,upper(t)}$" at the point "t+4" can be calculated on the basis of a target power profile value, for example of a target speed profile value at the point "t+6".

In a second step 115 it is judged, on the basis of a profile 217 of the lower limit line 111 determined in step 101 and a profile 215 of the upper limit line 109 determined in step 101, as well as including the current vehicle speed 113 and the target speed specification 103, whether an expectation characteristic curve intersects the lower limit line 111 or the upper limit line 109 within the tolerance time 105 or within a prediction window corresponding to the tolerance time 105.

In the event that the expectation characteristic curve determined on the basis of the current vehicle speed 113 intersects the lower limit line 111 within the tolerance time 105, a first control command 315 to accelerate the vehicle is enabled.

In the event that the expectation characteristic curve determined on the basis of the current vehicle speed 113 intersects the lower limit line 111 within the tolerance time 105, a second control command 319 to decelerate the vehicle is enabled.

It can be the case that in the event that, during a braking operation, a brake pedal value approaches a value "0" within a specified time window in the future or the brake pedal is released, and an acceleration is to take place following the braking, the brake pedal is released prematurely with respect to a specified brake pedal profile. The brake pedal or a corresponding brake can thereby be released as soon as a current speed of the vehicle is less than a value of the upper limit line 109 before the acceleration. Accordingly, a control command to accelerate can be provided prematurely, i.e. before an acceleration time specified according to a specified driving profile, as a result of which so-called "undershoots" can be avoided.

Figure 2:
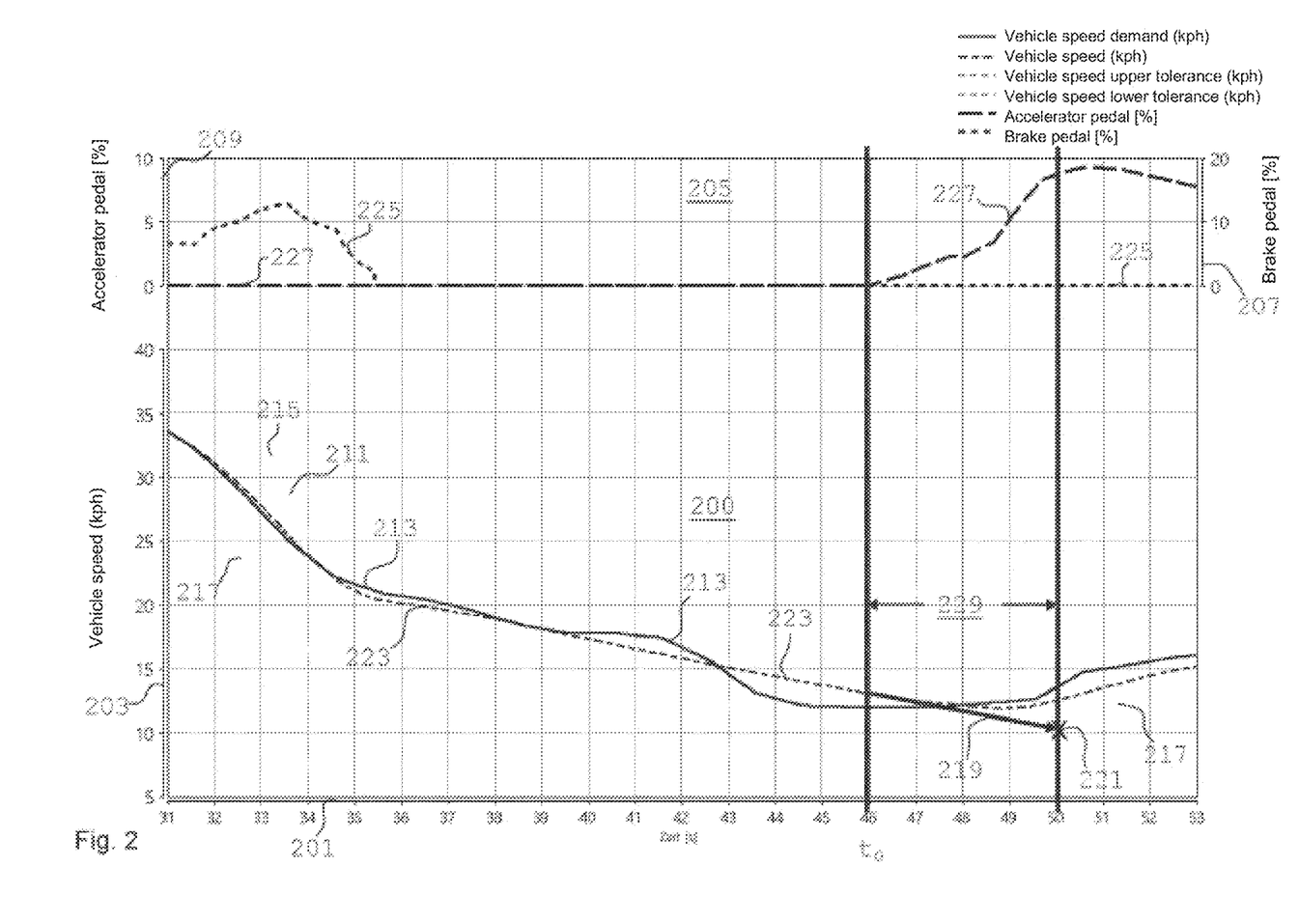
FIG. 2 shows a visualisation of a tolerance band for a target power profile curve with an expectation characteristic curve within a prediction window according to a possible embodiment of the method according to the invention.

FIG. 2 shows a diagram 200 in which the time in [seconds] is plotted on an abscissa 201 and a vehicle speed in [Km/h] is plotted on a first ordinate 203.

FIG. 2 also shows a diagram 205 representing the abscissa 201, a brake pedal position in [%] plotted on a second ordinate 207 and an accelerator pedal position in [%] plotted on a third ordinate 209.

In the diagram 200, a tolerance band 211 is shown which runs approximately parallel to a target power profile curve 213, which can for example be a target speed profile curve, and is limited by an upper limit line 215 and a lower limit line 217.

The target power profile curve 213 is for example specified through a test, in particular through a test for measuring vehicle emissions. Accordingly, respective values of the target power profile curve 213 are known before and after a current time to.

Starting out from the current time to at 46 seconds, an expectation characteristic curve 219 is shown which intersects the lower limit line 217 at an intersection point 221.

Historical values of the expectation characteristic curve 219, which are based on real values for the speed of the vehicle in the past, are represented before the current time to by a speed line 223. This differs more or less from the target power profile curve 213 depending on the accuracy of control. As shown in the diagram 200, the speed line 223 lies below or on the target power profile curve 213 in the interval from 34.5 seconds to 42.7 seconds and lies above the target power profile curve 213 in the interval from 42.7 seconds to 47.8 seconds.

Diagram 205 shows a profile 225 of a brake pedal position and a profile of an accelerator pedal position 227. The brake pedal is operated with varying force at the beginning of the represented interval from 31 seconds up to the time 35.4 seconds. Thereafter, the brake pedal is no longer operated. The accelerator pedal position 227 lies at 0% in the represented interval from 31 seconds to 46 seconds and is operated at the time t0, which lies at 46 seconds. Since in this case the target power profile curve 213 falls up to the time 34.5 seconds and the speed line 223 lies above the target power profile curve 213, the brake pedal was operated by a driver of the vehicle during this interval with a value above 7%. At the time 34.5 seconds the speed line 223 corresponds to the target power profile curve 213, and the driver eased off operation of the brake pedal up until the brake pedal was released completely at the time 35.4 seconds. From this time, neither the brake pedal nor the accelerator pedal were operated and the speed line 223 decreased steadily up to the current time t0 (46 seconds).

Since, moreover, the historical values of the expectation characteristic curve 219, as indicated by the speed line 223, have not intersected the lower limit line 217 up to the time t0, a control command to change the accelerator pedal position 227 was not enabled, so that the accelerator pedal position 227 has not changed up to the time to.

In this case, within a prediction time window 229, which extends from the time t0 (46 seconds) 4 seconds in the future up to the time 50 seconds, maintaining the current settings of the vehicle, the expectation characteristic curve 219 will intersect the lower limit line 217, as indicated by the intersection point 221. Due to the occurrence of the intersection point 221, a control command to change the accelerator pedal position 227 is enabled, so that a corresponding advice to operate the accelerator pedal is output to the driver on a display and the driver accelerates the vehicle in order to keep the vehicle within the tolerance band.

Naturally, the control command can also be enabled in such a way that the control command is communicated to a vehicle control device which operates the accelerator pedal accordingly or simulates an operation of the accelerator pedal.

Figure 3:
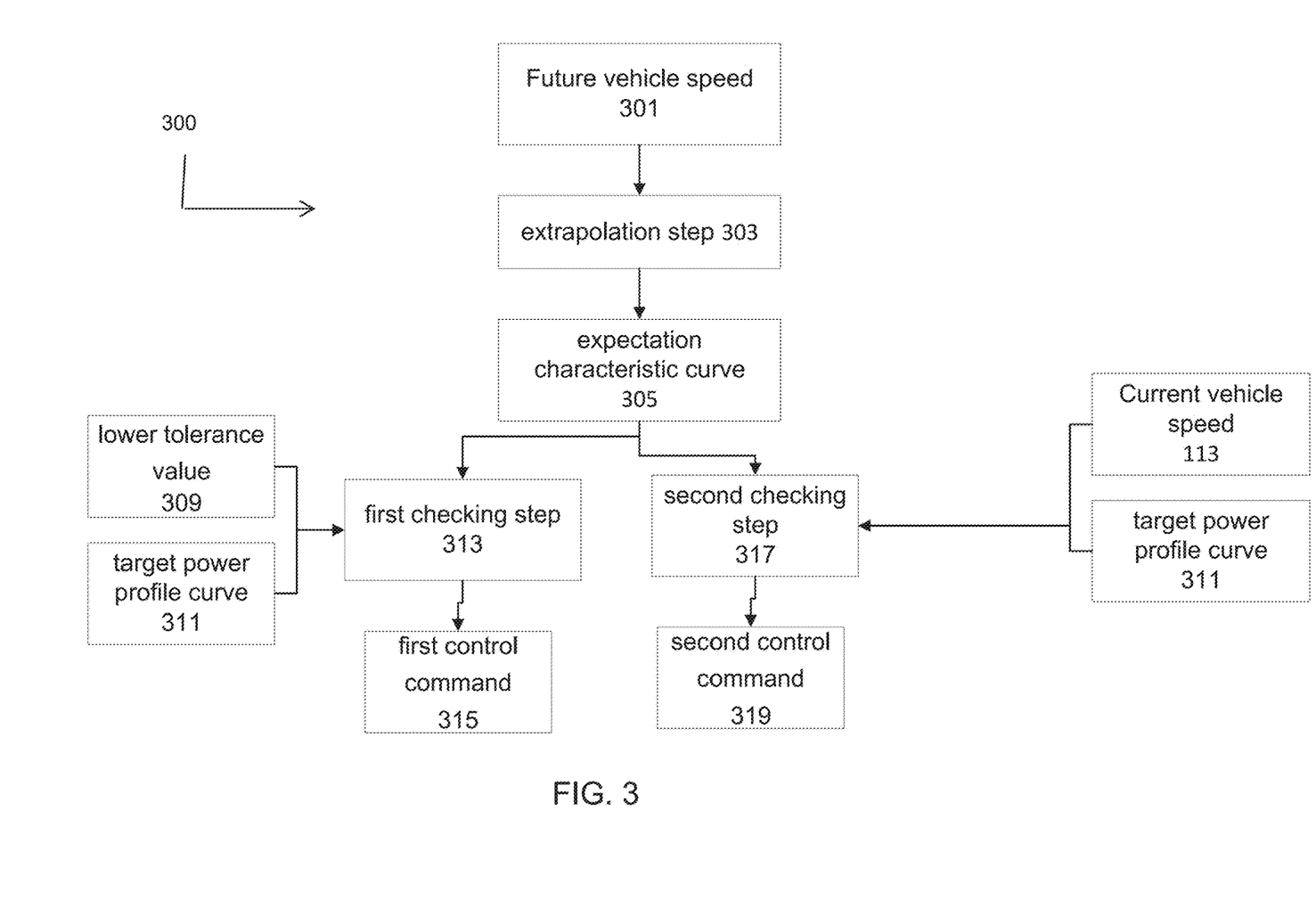
FIG. 3 shows a sequence of an enabling procedure according to a possible embodiment of the method according to the invention.

FIG. 3 shows a detailed sequence 300 of a procedure for enabling a control command, for example the control command to operate the accelerator pedal according to FIG. 2.

In an extrapolation step 303, an expectation characteristic curve 305 of the future vehicle speed 301 is determined starting out from a parameter current vehicle speed 301. For this purpose, the expectation characteristic curve 305 is extrapolated over a time window, starting out from a current time t0 up to a specified value, for example 0.2 seconds in the past. Alternatively, a vehicle model can be used to calculate the expectation characteristic curve.

In a first checking step 313, a lower limit line of a tolerance band of the target power profile curve 311 is determined on the basis of a lower tolerance value 307 and a target power profile curve 311. On the basis of the expectation characteristic curve 305 determined in the extrapolation step 303 it is checked whether this intersects the lower limit line within a prediction window. In the event that the expectation characteristic curve 305 intersects the lower limit line, a first control command 315 to accelerate the vehicle is enabled.

In a second checking step 317, an upper limit line of a tolerance band of the target power profile curve 311 is determined on the basis of an upper tolerance value 307 and a target power profile curve 311. On the basis of the expectation characteristic curve 305 determined in the extrapolation step 303 it is checked whether this intersects the upper limit line within a prediction window. In the event that the expectation characteristic curve 305 intersects the upper limit line, a second control command 319 to decelerate the vehicle is enabled. Since as a rule only one control command is enabled here, it is checked which of the two intersection points occurs earlier and the control command corresponding with the earlier intersection point is enabled.

Figure 4:
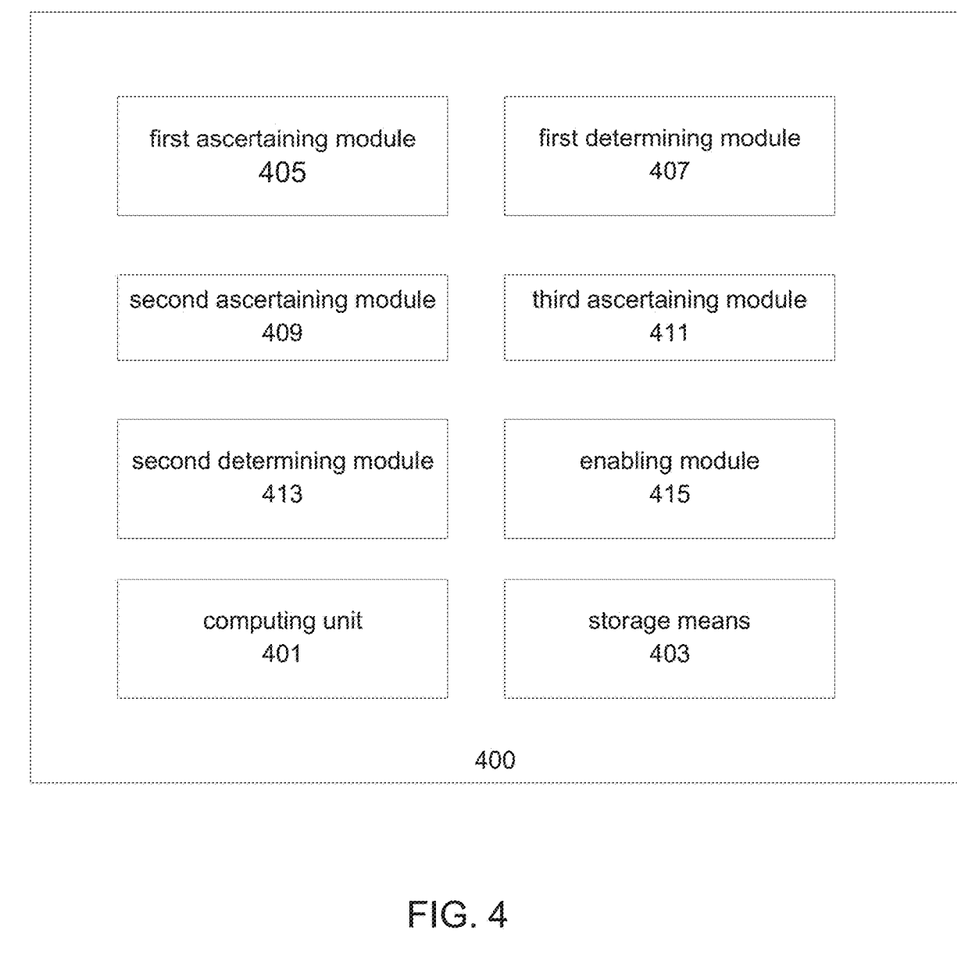
FIG. 4 shows a view of a possible embodiment of the control device according to the invention.

A possible embodiment of the control device 400 according to the invention is represented in FIG. 4.

The control device 400 serves to control or adjust a vehicle during a test run by means of a driver model.

The control device 400 comprises a computing unit 401 and a storage means 403, in which a computer program is stored to carry out all steps of the method according to the invention.

The computer program configures the computing unit 401 to ascertain, by means of a first ascertaining module 405, a specified target power profile curve for the vehicle, i.e. for example to load the target power profile curve from a storage means 403, for example a cloud server, and to determine a tolerance band for the target power profile curve by means of a first determining module 407. The tolerance band is limited by an upper limit line and a lower limit line. The upper limit line is ascertained by the computing unit 401 by means of a second ascertaining module 409 on the basis of a profile of the target power profile curve plus a specified upper tolerance value, the lower limit line is ascertained by the computing unit 401 by means of a third ascertaining module 411 on the basis of the profile of the target power profile curve minus a specified lower tolerance value.

An expectation characteristic curve for a power of the vehicle to be expected in the future is also determined by the computing unit 401, by means of a second determining module 413, by extrapolating a power development of the vehicle at a current setting of the vehicle for a specified temporal prediction window.

An enabling module 415 of the computing unit 401 enables a control command to be provided by the driver model to change the setting of the vehicle in the event that the expectation characteristic curve intersects at least one of the upper limit line and the lower limit line of the tolerance band within the temporal prediction window.

In addition to the illustrated embodiments, the invention allows for further design principles. This means that the invention should not be considered to be limited to the exemplary embodiments explained with reference to the figures.

LIST OF REFERENCE SIGNS 100 sequence
101 first step
103 target speed specification
105 tolerance time
107 tolerance speed
109 upper limit line 111 lower limit line
113 vehicle speed
200 diagram
201 abscissa
203 first ordinate
205 diagram
207 second ordinate
209 third ordinate
211 tolerance band
213 target power profile curve
215 upper limit line
217 lower limit line
219 expectation characteristic curve
221 intersection point
223 speed line
225 brake pedal profile
227 accelerator pedal position
229 prediction time window
300 sequence
301 vehicle speed
303 extrapolation step
305 expectation characteristic curve
307 upper tolerance value
309 lower tolerance value
311 target power profile curve
313 first checking step
315 first control command
317 second checking step
319 second control command
400 control device
401 computing unit
403 storage means
405 first ascertaining module
407 first determining module
409 second ascertaining module
411 third ascertaining module
413 second determining module
415 enabling module

The invention claimed is:

1. A method for operating a driver model for controlling a vehicle, wherein the method comprises the following steps for:
  a) ascertaining a specified target power profile curve (213, 311) for the vehicle,
  b) determining a tolerance band (211) for the specified target power profile curve (213, 311), wherein the tolerance band (211) is limited by an upper limit line (109, 215) and a lower limit line (111, 217), wherein the upper limit line (109, 215) is determined based on a profile (225) of the specified target power profile curve (213, 311) plus a specified upper tolerance value (307), and wherein the lower limit line (111, 217) is determined based on the profile (225) of the specified target power profile curve (213, 311) minus a specified lower tolerance value (309),
  c) determining an expectation characteristic curve (305) for a power of the vehicle to be expected by extrapolating (303) a power development of the vehicle at a current setting of the vehicle for a prediction window (229) with a specified temporal length, and
  d) enabling a control command (315, 319) by the driver model to change a setting of the vehicle in case that the expectation characteristic curve (305) intersects at least one of the upper limit line (109, 215) and the lower limit line (111, 217) of the tolerance band (211) within a temporal prediction window (229).

2. The method according to claim 1,
characterised in that
changing the settings of the vehicle in case that the expectation characteristic curve (305) intersects the upper limit line (109, 215) involves enabling a first control command (315) which results in a reduction in a power output of the vehicle, and
changing the settings of the vehicle in case that the expectation characteristic curve (305) intersects the lower limit line (111, 217) involves enabling a second control command (319) which results in an increase in a power output of the vehicle.

3. The method according to claim 2,
characterised in that
the first control command (315) activates a braking system of the vehicle and/or causes a reduction in a power output of the drive, and
the second control command (319) configures a drive system of the vehicle to provide a higher power output in relation to a current power output.

4. The method according to claim 2,
characterised in that
an accelerator pedal and a brake pedal of the vehicle must be in a zero position to enable a change between the first control command (315) and the second control command (319).

5. The method according to claim 1,
characterised in that
in case that the expectation characteristic curve (305) intersects at least one of the upper limit line (109, 215) and the lower limit line (111, 217), a weighting factor is determined which varies depending on a time interval between an intersection point (221) of the expectation characteristic curve (305) and the upper limit line (109, 215) or the lower limit line (111, 217) and a current time (t0),
wherein an order of priority of intersection points (221) to be used in enabling control commands (315, 319) is determined based on the weighting factor.

6. The method according to claim 1,
characterised in that
the expectation characteristic curve (305) is determined based on historical power data of the vehicle within a specified time window starting out from a current time (t0),
wherein the expectation characteristic curve (305) is determined on the assumption that a power output and/or a value of an acceleration of the vehicle remains constant within the prediction window.

7. The method according to claim 1,
characterised in that
the prediction window (229) is continuously updated,
wherein, within the prediction window (229) comprising a first checking step (313) for continuously checking whether the expectation characteristic curve (305) intersects the upper limit line (109, 215) and comprising a second checking step (317) for continuously checking whether the expectation characteristic curve (209, 305) intersects the lower limit line (111, 217).

8. The method according to claim 7,
characterised in that
in the first checking step (313) it is in addition checked whether preceding power requirements specified through the specified target power profile curve (213, 311) continuously approach a zero value within the prediction window (229) and, in case that the preceding power requirements specified through the specified target power profile curve (213, 311) continuously approach the zero value within the prediction window (229), a control command (315, 319) is enabled which brings the vehicle to a halt according to a specified procedure.

9. The method according to claim 7, characterised in that the prediction window has a dynamic temporal length.

10. A computer program product comprising program code means for carrying out all steps according to claim 1 when the program is run on a computer.

11. A control device (400) for a vehicle, wherein the control device (400) comprises at least one computing unit (401), and the at least one computing unit (401) comprises at least:
- a first ascertaining module (405) for ascertaining a specified target power profile curve (213, 311) for the vehicle,
- a first determining module (407) for determining a tolerance band (211) for the specified target power profile curve (213, 311), wherein the tolerance band (211) is limited by an upper limit line (109, 215) and a lower limit line (111, 217),
- a second ascertaining module (409) for ascertaining the upper limit line (109, 215) based on a profile of the specified target power profile curve (213, 311) plus a specified upper tolerance value (307),
- a third ascertaining module (411) for ascertaining the lower limit line based on the profile of the specified target power profile curve (213, 311) minus a specified lower tolerance value (309),
- a second determining module (413) for determining an expectation characteristic curve (305) for a power of the vehicle to be expected by extrapolating (303) a power development of the vehicle at a current setting of the vehicle for a specified temporal prediction window (229), and
- an enabling module (415) for enabling a control command (315, 319) to be provided by the driver model in order to modify the setting of the vehicle in case that the expectation characteristic curve (219, 305) intersects at least one of the upper limit line (109, 215) and the lower limit line (111, 217) of the tolerance band (211) within the specified temporal prediction window (229).

12. A method to carry out a test run for a vehicle using control device 400 according to claim 11.

* * * * *